R. A. FESSENDEN.
SIGNALING.
APPLICATION FILED NOV. 3, 1905.

1,019,236.

Patented Mar. 5, 1912.
6 SHEETS—SHEET 1.

WITNESSES:
Herbert Bradley.
Carl Siedle

INVENTOR
Reginald A. Fessenden
by Darwin S. Wolcott Atty

R. A. FESSENDEN.
SIGNALING.
APPLICATION FILED NOV. 3, 1905.

1,019,236.

Patented Mar. 5, 1912.
6 SHEETS—SHEET 2.

WITNESSES:
Herbert Bradley.
Carl Siedle

INVENTOR
Reginald A. Fessenden
by Darwin S. Wolcott Atty

R. A. FESSENDEN.
SIGNALING.
APPLICATION FILED NOV. 3, 1905.

1,019,236.

Patented Mar. 5, 1912.
6 SHEETS—SHEET 4.

R. A. FESSENDEN.
SIGNALING.
APPLICATION FILED NOV. 3, 1905.

1,019,236.

Patented Mar. 5, 1912.

6 SHEETS—SHEET 5.

WITNESSES:
Herbert Bradley.
Carl Siedle

INVENTOR
Reginald A. Fessenden
by Darwin S. Wolcott Atty

R. A. FESSENDEN.
SIGNALING.
APPLICATION FILED NOV. 3, 1905.
1,019,236.
Patented Mar. 5, 1912.
6 SHEETS—SHEET 6.
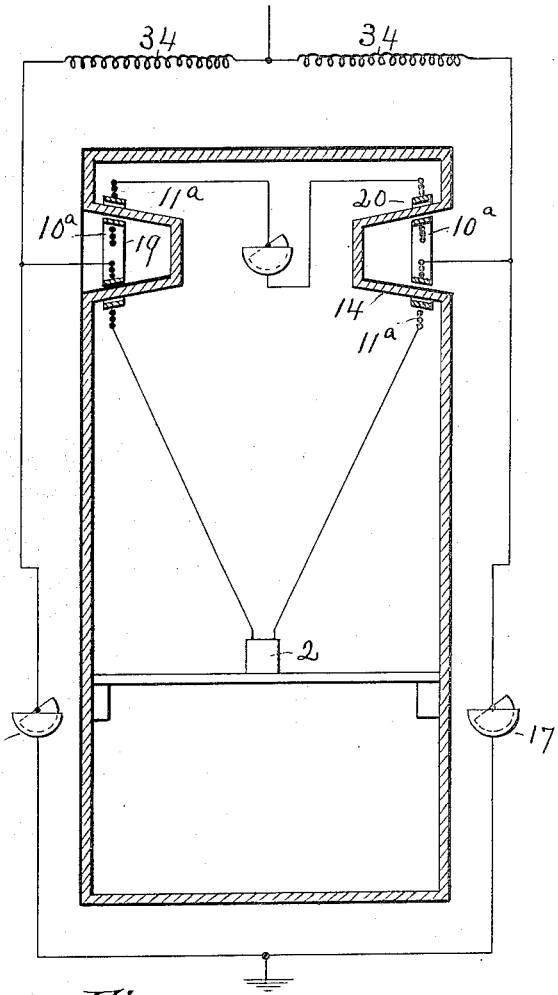
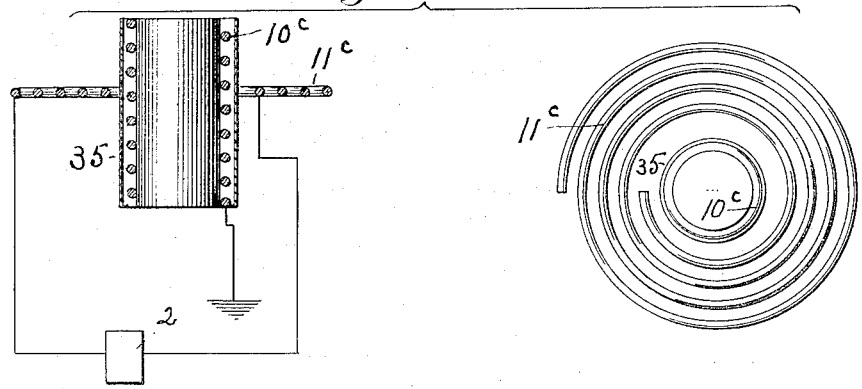
Witnesses:
C. A. Langfellow
E. P. Bitzel
Inventor:
Reginald A. Fessenden
by Dennis B. Wolcott
Attorney.

UNITED STATES PATENT OFFICE.

REGINALD A. FESSENDEN, OF WASHINGTON, DISTRICT OF COLUMBIA, ASSIGNOR TO NATIONAL ELECTRIC SIGNALING COMPANY, OF PITTSBURGH, PENNSYLVANIA, A CORPORATION OF NEW JERSEY.

SIGNALING.

1,019,236. Specification of Letters Patent. Patented Mar. 5, 1912.

Application filed November 3, 1905. Serial No. 285,725.

*To all whom it may concern:*

Be it known that I, REGINALD A. FESSENDEN, residing at Washington, in the District of Columbia, a citizen of the United States, have invented certain new and useful Improvements in Signaling, of which the following is a specification.

The invention described herein relates to the art of signaling by electromagnetic waves, said improvements being especially directed to the elimination of disturbances especially those producing electrostatic effects.

Disturbances, especially the magnetic effects due to electromagnetic waves produced by atmospheric disturbances and the electromagnetic effects produced by the electrostatic actions of atmospheric disturbances can be eliminated by methods and apparatus heretofore known. There remain however certain direct electrostatic effects upon the receiver, which though reduced, modified and rendered innocuous in ways heretofore described may be completely eliminated and rendered nondisturbing by the method hereinafter more fully described and claimed.

Figure 1:
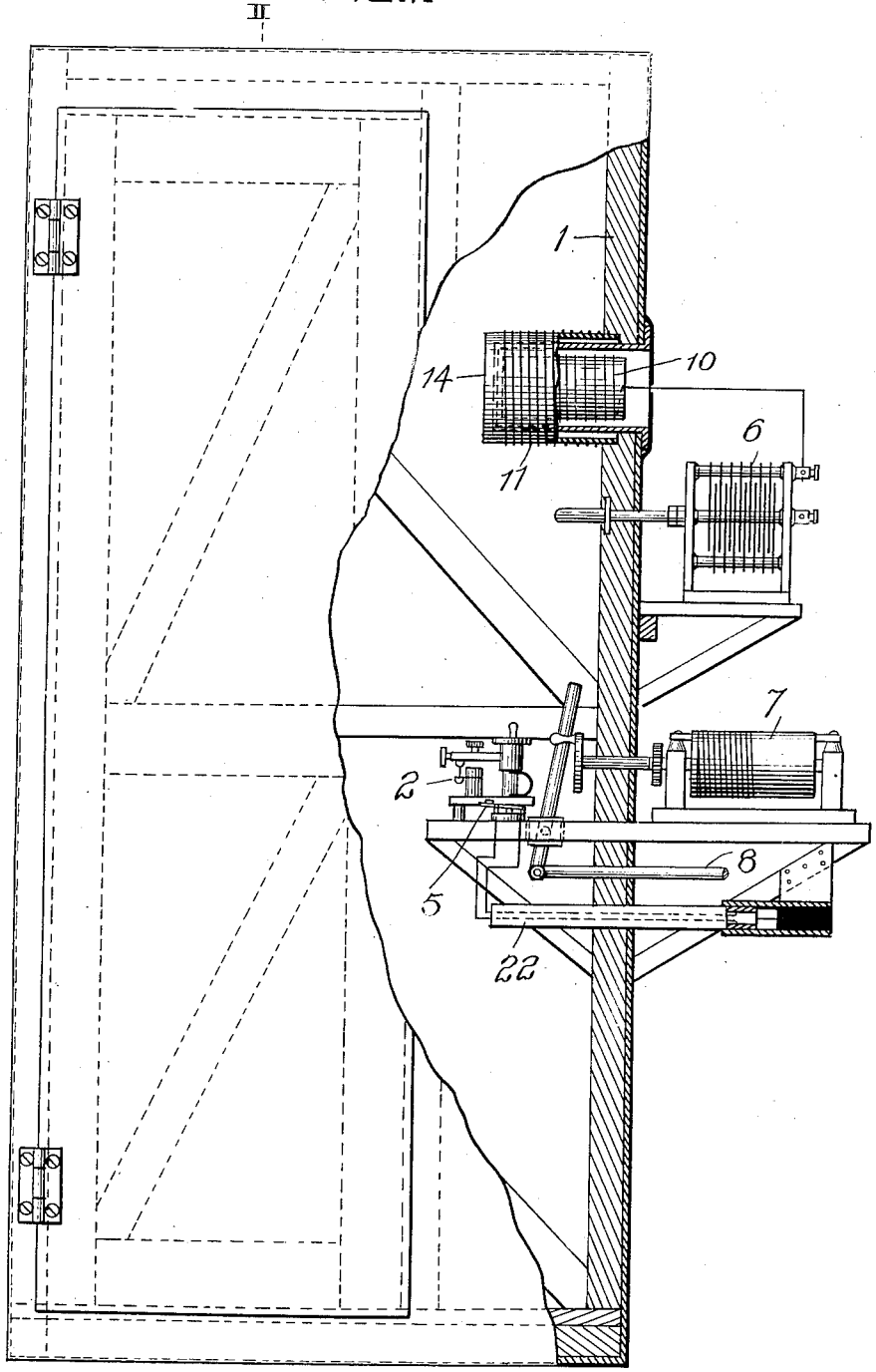
Figure 2:
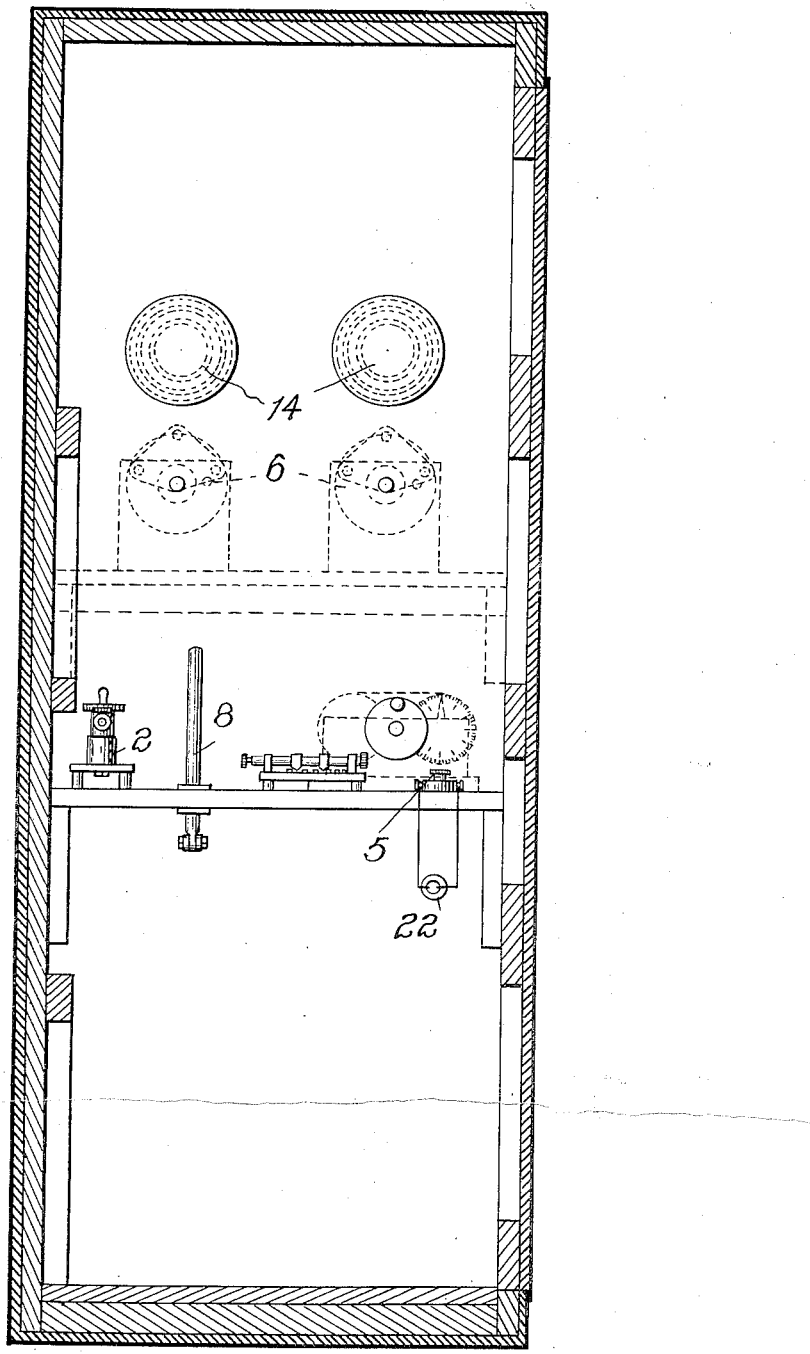
Figure 3:
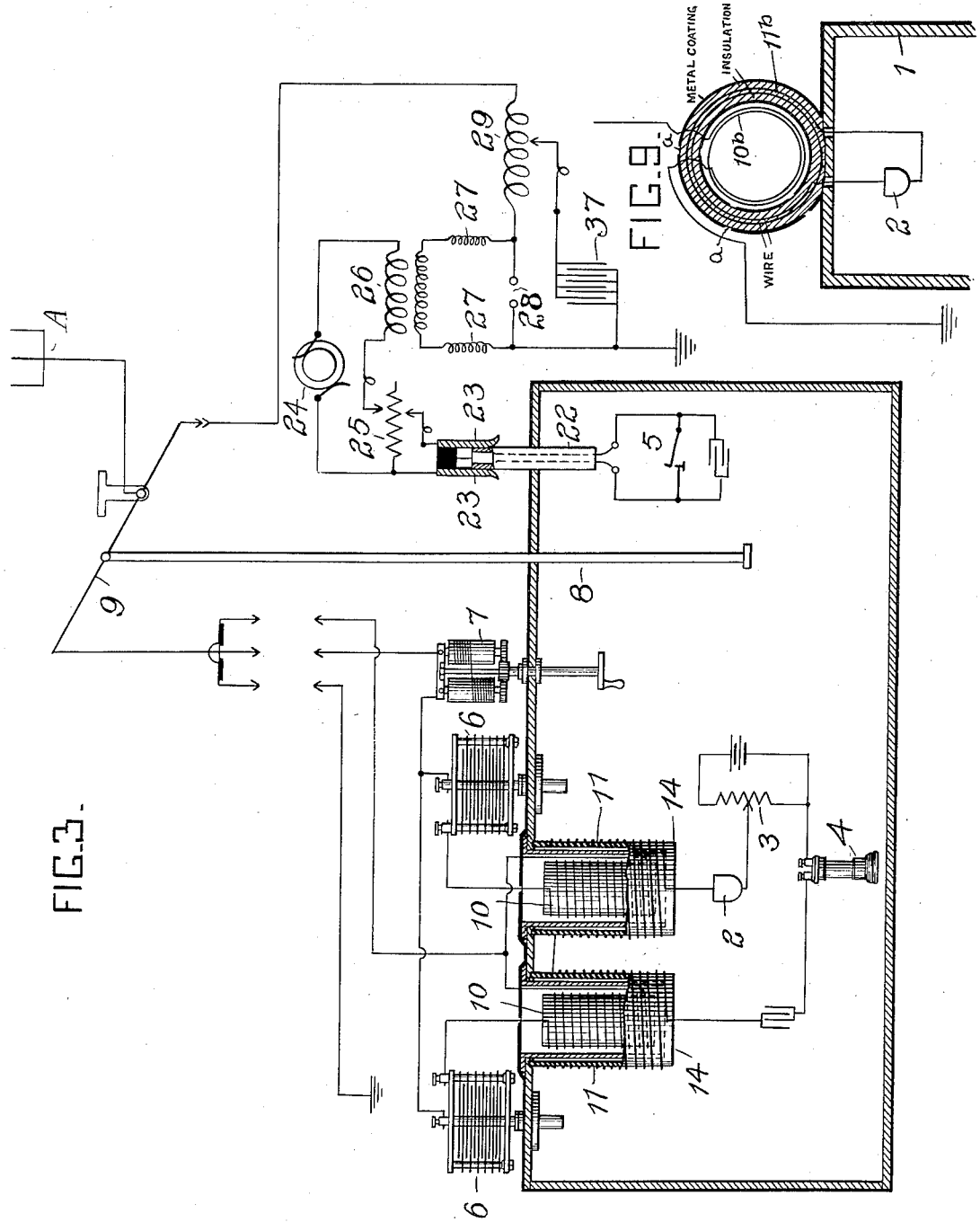
Figure 4:
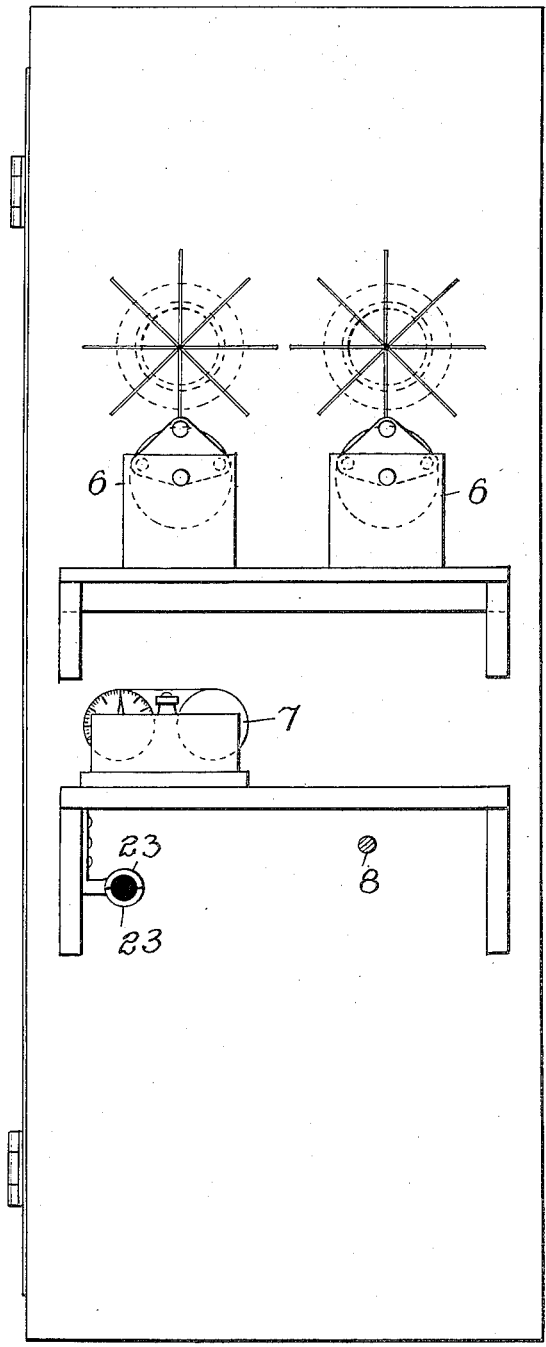
Figure 5:
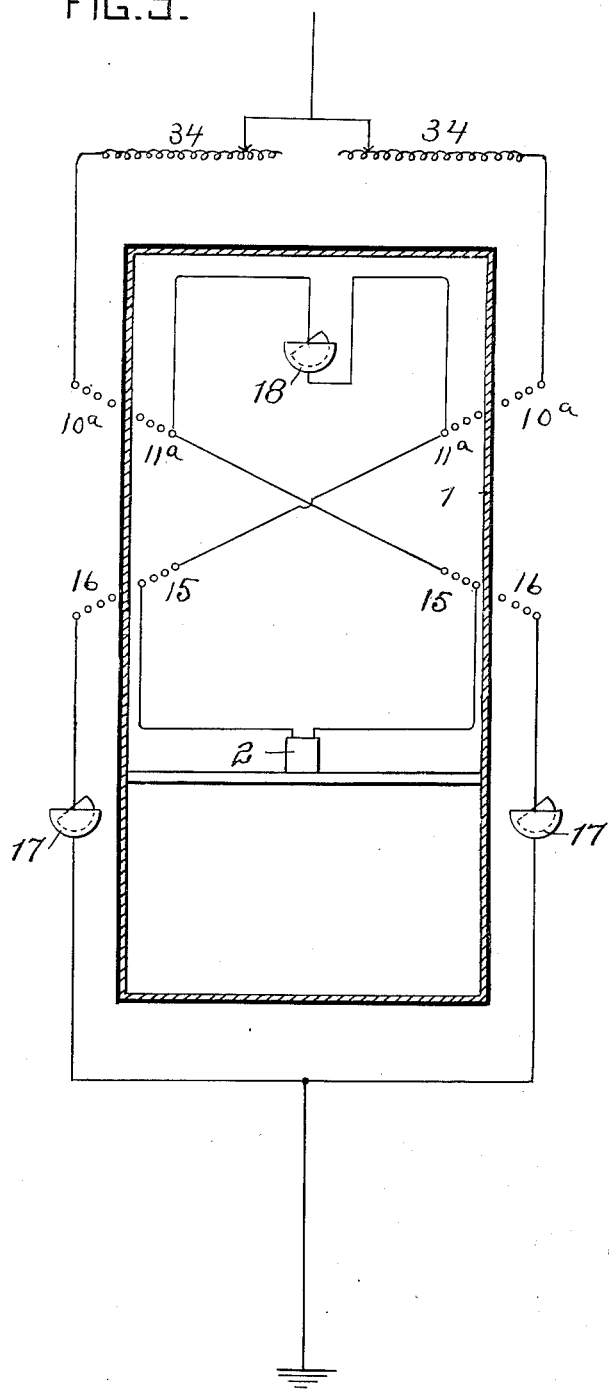
Figure 6:
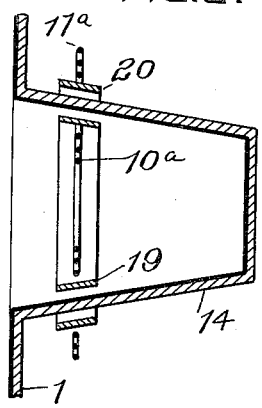
Figure 7:
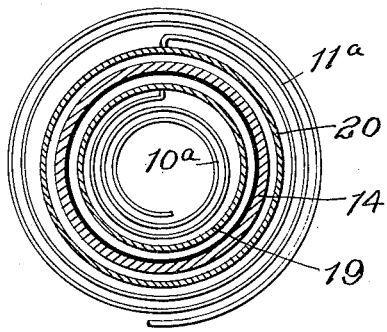
Figure 8:
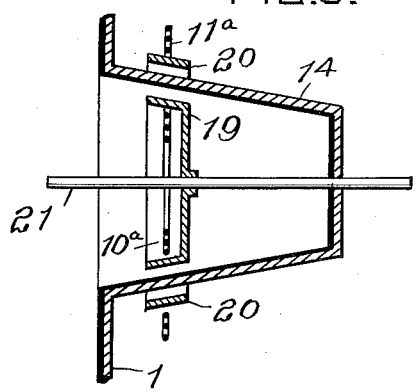

In the accompanying drawings forming a part of this specification Figure 1 is a view partly in elevation and partly in section showing the receiver and other portions of receiving and sending apparatus inclosed in a Faraday box; Fig. 2 is a sectional elevation of the same on a plane indicated by the line II—II Fig. 1; Fig. 3 is a diagrammatic view showing the portions of the sending and receiving apparatus which are desirably inclosed within the box; Fig. 4 is a side elevation of the box; Fig. 5 is a section and diagram showing the connection of the elements inside of the box with the aerial and ground; Figs. 6 and 7 illustrate in preferred form an arrangement of the parts of the inductances and Fig. 8 illustrates a further modification showing a means for adjusting the capacity. Fig. 9 illustrates a modification of the inductive connection between the parts inside; Fig. 10 illustrates a further modification of the inductive connection; Fig. 11 illustrates a modification of the construction shown in Fig. 5.

In the practice of my invention I provide a screen or shield which will prevent electrostatic disturbances producing any effect on the receiver although such disturbances may affect the antenna, or other parts of the apparatus not directly connected to the receiver. To this end the receiver and also by preference the local circuit and indicating device or mechanism are inclosed in a shell of conducting material, such as tin foil, wire gauze or thin sheet copper, and the parts of the apparatus within the shell are preferably inductively connected with the antennæ and other parts of apparatus outside of the shell, thus rendering any electrostatic effect produced by the primary on the secondary of the inductive connection between the antennæ and the receiver, very small and negligible.

In the construction shown in Figs. 1, etc., I preferably employ a wooden box 1 having a covering of conducting material such as tin foil, wire gauze or thin metal sheets or other suitable material. It is preferred that the box should be made large enough for the operator to work in. It is also preferred to arrange in this box with the receiver 2, a potentiometer 3, (Fig. 3) an indicating mechanism as the telephone 4, the sending key 5, and necessary or desirable connections for these parts. The condensers 6 are preferably variable, and the adjustable inductance 7 may be arranged outside of the box, their operating handle projecting into the box as shown to permit the ready adjustment of the condensers and inductance. The handle or rod 8 of the switch 9 for changing from sending to receiving also extends into the box. The aerial is preferably connected to the receiver inductively and preferably by means of a double primary and secondary.

In the construction shown in Figs. 1, 2 and 3 the primaries 10 are arranged within reëntrant portions 14 of the Faraday box and the secondaries 11 are wound around such reëntrant portions as clearly shown in Figs. 1 and 3. While the coils of the primaries and secondaries may be wound cylindrical as shown in Figs. 1 and 3, it is preferred that they should be made in the form of flat spirals as shown at 10$^a$ and 11$^a$ Figs. 5, 6 and 7, and to so arrange said parts that there will not be any mutual inductance between the two primaries or the two secondaries as such mutual inductance would introduce disturbing elements. For this purpose the arrangement shown in Fig. 5 is preferred, having the box 1 constructed as described or in any suitable manner to protect the receiver from electrostatic effects. The aerial is connected through inductances 34 to primaries 10$^a$ and 16 preferably made in the form of flat spirals either round or square, preferably the latter, and arranged outside encircling the box and standing at an angle to the box and also at preferably a right angle to each other. The secondaries 11$^a$ and 15 also in the form of flat spirals are similarly arranged inside of the box. These secondaries are connected and the primaries 10$^a$ and 16 of this inductive connection are connected preferably through variable condensers 17 to ground. The positions of the variable inductances 34 and condensers 17 may be interchanged so that the condensers will be between the vertical and the inductive connections and the inductances between the other inductive connections and the ground. The receiver 2 is connected as shown to the secondaries 15, and if desired a variable condenser 18 may be connected to the secondaries 11$^a$ and 15 but such condenser may be omitted. The conducting covering or shield is preferably slotted as shown in Fig. 4 to prevent eddy currents being induced in it by the primary or secondary coils, and for this reason the slots are preferably formed at right angles to the circumference of the coils forming the inductive connections. While it is preferred that the conducting covering or shield should be connected to ground as shown, such ground connection is not necessary.

As shown in Figs. 6, 7 and 8, one terminal of the primaries of the inductive connections may be connected to a conducting strip of metal 19 so as to form a capacity between the primaries and ground as in Fig. 11. One terminal of the secondaries may also be connected to a similar strip of metal 20, which however may be omitted and that terminal of secondaries left open. The proximity of the metal strips 19 and 20 to the conducting covering may be varied by suitable means as the sliding rod 21, so as to vary the capacities.

The wires leading from the key 5 (Fig. 3) are arranged in a movable plug 22 having contact strips adapted to engage similar strips 23 forming parts of the sending apparatus, which includes an alternating generator 24, a resistance 25 preferably inductive, a high potential transformer 26, choke coils 27, a spark gap 28, an adjustable inductance 29 and a condenser 37, said parts being arranged in proper relation to each other and to the aerial.

In lieu of a telephone any other suitable form or construction of indicating mechanism may be employed in connection with a receiver preferably of the current operated type, i. e., the hot wire barretter, liquid barretter or ring type.

In Fig. 9 I have shown a desirable construction of the inductive connection between the parts inside and outside of the box or booth. One of the elements of the inductive connection as the primary 10$^b$, is formed by a coil of wire which may if desired be covered with insulating material, and the other part or element as the secondary 11$^b$, is formed by a coil of insulated wire, the insulation being covered with conducting material as lead or tin foil. This conducting covering may be continuous and if desired connected to the conducting covering of the box. It is preferred however, that the conducting covering of the member of the inductive connection should be discontinuous as indicated at $a$ for the purpose of preventing objectionable current flow, losses and imperfect tuning.

As shown in Fig. 10 one of the members of an inductive connection between the antenna and the receiver, as the primary coil 10$^c$ may be cylindrical while the other member as the secondary 11$^c$ is wound in the shape of a flat coil. As shown a conducting surface 35 may be interposed between the primary and secondary.

I claim herein as my invention:

1. Apparatus for signaling by electromagnetic waves, comprising an aerial, a receiver, a case composed of conducting material surrounding the receiver, and an inductive connection from the aerial to the receiver, the aerial circuit being entirely outside the case.

2. Apparatus for signaling by electromagnetic waves, comprising an aerial, a receiver, a case surrounding the receiver and shielding it from electrostatic disturbances while receiving, an inductive connection between the aerial and receiver, the aerial circuit being entirely outside the case.

3. Apparatus for signaling by electromagnetic waves, comprising an inductive connection between a receiver and aerial and consisting of coils located respectively outside and inside a shield, one of which coils is formed of insulated wire having a conducting coating, so as to shield the primary from disturbing effects due to the secondary of the inductive connection.

4. Apparatus for signaling by electromagnetic waves, comprising a booth having a conducting covering, a receiver in the booth, an aerial, two coils arranged in inductive relation and respectively inside and outside the booth and connected to the receiver and aerial and one of said coils being formed of insulated wire with a conductive coating, whereby the primary is shielded from disturbing effects due to the secondary of the inductive coupling.

5. The combination with a receiver for electromagnetic waves, of a metallic inclosure therefor, an aerial, a transformer inductively connecting the aerial and the receiver, and having its primary and secondary coils respectively outside and inside said metallic inclosure.

6. The combination with a detector circuit, and an aerial, of a metallic casing inclosing said detector circuit, a secondary coil also inclosed in the casing and connected to said circuit, and a primary coil inductively related to said secondary and located outside the casing and connected to the aerial.

7. In wireless telegraphy, the combination of a receiver circuit, including the secondary of a transformer, a metallic casing surrounding said circuit, an aerial, and a connected primary located entirely outside said casing, substantially as described.

In testimony whereof, I have hereunto set my hand.

REGINALD A. FESSENDEN.

Witnesses:
HELEN M. FESSENDEN,
JESSIE E. BENT.